United States Patent
Thomas

[19]
[11] Patent Number: 5,869,566
[45] Date of Patent: Feb. 9, 1999

[54] RAPID DRYING, ISOCYANATE CURED COATING COMPOSITION WITH IMPROVED ADHESION

[75] Inventor: Stephen J. Thomas, Aspinwall, Pa.

[73] Assignee: PPG Industries, Inc., Pittsburgh, Pa.

[21] Appl. No.: 936,346

[22] Filed: Sep. 24, 1997

[51] Int. Cl.$^6$ .............................. C08J 3/00; C08K 3/20; C08L 75/00; C08G 18/00
[52] U.S. Cl. .............................. 524/590; 524/589; 528/44
[58] Field of Search ..................... 524/589, 590; 528/44

[56] References Cited

U.S. PATENT DOCUMENTS

| | | | |
|---|---|---|---|
| 4,650,718 | 3/1987 | Simpson et al. | 428/413 |
| 5,196,485 | 3/1993 | McMonigal et al. | 525/327.3 |
| 5,468,802 | 11/1995 | Wilt et al. | 524/539 |
| 5,714,564 | 2/1998 | Schaffer | 528/67 |

FOREIGN PATENT DOCUMENTS

| | | |
|---|---|---|
| 84-88373 | 4/1984 | Japan . |
| 84-88374 | 4/1984 | Japan . |

OTHER PUBLICATIONS

High Solids Coatings Based on a Novel Triisocyanate, M. Ojunga–Andrew, et al Monsanto Company, Feb. 22–24, 1995, pp. 200–210.

Kinetics of Reaction of n–Butanol and Triaminononane Trisisocyanate Measured via $^{13}$C Solution NMR, M. R. Krejsa, et al., Monsanto Company, pp. 2141–2154.

*Primary Examiner*—Patrick D. Niland
*Attorney, Agent, or Firm*—Dennis G. Millman

[57] ABSTRACT

A coating composition contains an active hydrogen group-containing polymer (e.g., polyol and/or polyester) and a polyisocyanate curing agent. The polyisocyanate curing agent contains (i) at least 5 weight percent triaminononane triisocyanate, and (ii) at least 5 weight percent of a polyisocyanate different from (i) wherein the percentages are based on the total resin solids content of the coating composition. The composition exhibits a combination of good adhesion and rapid dry time that makes the composition particularly useful as an automotive refinish coating.

13 Claims, No Drawings

RAPID DRYING, ISOCYANATE CURED COATING COMPOSITION WITH IMPROVED ADHESION

BACKGROUND OF THE INVENTION

The present invention relates to coating compositions based on polymers having active hydrogen groups (particularly hydroxyl groups) which are cured with polyisocyanates. Although not limited thereto, these are particularly adapted for automotive refinish applications. Utility for other types of coating applications is also contemplated.

It is desirable to provide coating compositions that have excellent physical properties and appearance and also are formulated with minimal amounts of volatile organic content ("VOC"). This is especially true in the automotive coatings area where the finish of the automobile is a particularly important feature but is difficult to achieve with coating compositions having reduced amounts of organic solvents. In the automotive refinish coating area, there is the further requirement that the coating composition be capable of ambient temperature cure or at most a forced heating step with a slightly elevated temperature. Automotive clear coatings pose an additional challenge since the clear coatings must adhere well to the pigmented basecoats onto which they are applied.

In order to provide coating compositions with suitably low viscosity for application, for example, by spraying, while providing low VOC formulations, it has been necessary to resort to polymeric components of lower viscosity. For this purpose, suppliers of polyisocyanate curing agents have made available to the coating industry several low viscosity polyisocyanates that are useful as curing agents in conjunction with polymers having hydroxyl functionality or other functionality reactive with isocyanates. These include hexamethylenediisocyanate based materials and isophorone diisocyanate based materials. Using these materials, it has been found to be difficult to provide low VOC coatings with the combination of adhesion and rapid cure speed required for automotive refinish coatings. Another promising low viscosity curing agent is a triisocyanate derived from 4-aminomethyl-1,8-diaminooctane. This triisocyanate, informally known as triaminononane triisocyanate, is attractive because of its exceptionally low viscosity and low equivalent weight (84 grams per isocyanate equivalent). However, attempts to utilize triaminononane triisocyanate as the curing agent in coating compositions have heretofore been disappointing. More specifically, while it has shown a positive effect on adhesion, its effect on cure speed has not been favorable.

Accordingly, it would be desirable to be able to take advantage of the desirable characteristics of triaminononane triisocyanate without compromising other properties.

SUMMARY OF THE INVENTION

In accordance with the present invention, coating compositions cured with low viscosity polyisocyanates including triaminononane triisocyanate are provided with a combination of rapid curing and adhesion appropriate for use as automotive refinish coatings. Curing may take place at room temperature, and the adhesion to basecoats that is attained lends these coating compositions to use as clear topcoats. The coating compositions of this invention are characterized by:

(a) 55 to 80 weight percent of polymer containing active hydrogen groups, for example hydroxyl functional polymers selected from the group consisting of polyols, polyester polyols, and mixtures thereof; and (b) 20 to 45 weight percent of a polyisocyanate curing agent containing:
  (i) at least 5 weight percent triaminononane triisocyanate, and
  (ii) at least 5 weight percent of a polyisocyanate different from (i)

wherein all percentages are based on the sum of the weight of non-volatile resin content of (a) plus (b).

DETAILED DESCRIPTION OF THE INVENTION

The present invention will have utility for a wide range of coating applications. An area where the properties of the present invention are particularly desirable is for automotive refinish coatings. Therefore, the detailed description herein will relate to particular embodiments of automotive refinish coating compositions.

The coating compositions of the present invention contain an active hydrogen containing polymer and a polyisocyanate curing agent. The active hydrogen group contained in the polymer is most commonly a hydroxyl group, but other active hydrogen containing groups that are capable of reaction with isocyanate groups may be used instead. The hydroxy functional polymer may be a polyol, preferably a hydroxyl functional polyester, also referred to as a polyester polyol. Such a polyester polyol can be prepared by the polyesterification of a polyol with a carboxylic acid. Specifically, the hydroxyl functional polyester of the present invention is prepared from about 15 percent to about 50 percent of a polyol or mixture of polyols, each having a formula molecular weight ranging from about 50 to about 2,000. Preferably, the amount of polyol ranges from about 20 percent to about 45 percent and more preferably from about 30 percent to about 40 percent, the percentages based on the total weight of reactants used in preparing the polyester. Usually, the polyol is a diol or triol although polyols of higher functionality can be used. Preferably, the polyol has a formula molecular weight of from about 75 to about 1000 and more preferably from about 100 to about 300. Examples of suitable polyols include ethylene glycol, diethylene glycol, glycerol, trimethylpentane diol, cyclohexane diol, 1,6-hexanediol, trimethylolpropane, pentaerythritol, neopentyl glycol, 2-methylolpropane diol, ethoxylated trimethylolpropane and mixtures thereof.

In addition to the polyol described above, the hydroxyl functional polyester is prepared from about 15 percent to about 50 percent of a long chain monocarboxylic acid or mixture of such acids, each having from 6 to 24 carbon atoms, preferably 12 to 20 carbon atoms. Use of monocarboxylic acids having more than 24 carbons is not preferred since these materials, which tend to be soft and waxy, detract from the appearance of the cured film. Preferably the amount of long chain monocarboxylic acid ranges from about 20 percent to about 45 percent, more preferably from about 30 percent to about 40 percent, the percentages based on the total weight of reactants used in preparing the polyester. Examples of suitable long chain monocarboxylic acids include hexanoic acid, heptanoic acid, octanoic acid, nonanoic acid, decanoic acid, lauric acid, isostearic acid, stearic acid, hydroxystearic acid, linseed fatty acid, oleic acid, octadecanoic acid, tetradecanoic acid, icosane and mixtures thereof. Preferably the long chain monocarboxylic acid is isostearic acid. Also preferred is a mixture of isostearic acid and lauric acid.

A further ingredient used in the preparation of a particularly preferred hydroxyl functional polyester that may be included in preferred embodiments of automotive refinish coating compositions in accordance with the present invention is 1,4-cyclohexane dicarboxylic acid. The 1,4-cyclohexane dicarboxylic acid is used in an amount from about 15 percent to about 30 percent, more preferably from about 20 percent to about 25 percent, the percentages based on the total weight of reactants used in preparing the polyester. This material can be commercially obtained from Eastman Chemical Co. as "EASTMAN 1,4-CHDA" and is sold as a mixture of isomers. Preferred for use herein is a high purity grade of the product which is approximately 80:20 cis:trans. The "R" grade which is approximately 60:40 cis:trans can also be used. The 1,4-cyclohexane dicarboxylic acid is believed important in achieving good hardness, durability, ultraviolet light stability and faster tack time in the coating film. Further details of this polyester polyol are set forth in U.S. Pat. No. 5,468,820 (Wilt et al.).

The reactants used in preparing the hydroxyl functional polyester can additionally contain a mono or dicarboxylic acid or anhydride thereof different from the long chain monocarboxylic acid described above. Among the carboxylic acids or anhydrides which are useful are for example, adipic acid, succinic acid, suberic acid, pimeric acid, isophthalic acid, azelaic acid, sebacic acid, maleic acid, glutaric acid, dodecanedioic acid, terephthalic acid, chlorendic acid, cyclohexane carboxylic acid, hexahydrophthalic anhydride or mixtures thereof. The mono or dicarboxylic acid or anhydride thereof, when used, generally ranges from about 0 percent to about 50 percent, the percentage based on the total weight of reactants used in preparing the polyester. The ingredients used in preparing the hydroxyl functional polyester can also include minor amounts of mono basic acids such as benzoic acid or acetic acid. Also, there can be employed minor amounts of higher polycarboxylic acids such as trimellitic acid and tricarballylic acid. Also, lower alkyl esters of such acids such as dimethyl glutarate and dimethyl terephthalate can be used.

The polyesterification reaction is carried out in accordance with the techniques well known to those skilled in the art of polymer chemistry and will not be discussed in detail here. Generally, the reaction can be conducted by combining the ingredients and heating to a temperature of about 160° C. to about 220° C., often referred to as "hot melt" conditions. It is important to note however, that the polyesterification reaction is preferably conducted under azeotropic conditions using any solvent which forms a good azeotrope with water, for example xylene or 1-decene. Preferably xylene is utilized. The amount of azeotropic solvent generally ranges from about 3 percent to about 4 percent, based on the total weight of reactants used in preparing the polyester. Xylene is typically used in an amount of about 3 percent. During the course of the polyesterification, most of the polyester is formed in a temperature range of about 170° C. to about 220° C. which is preferred because the lower temperature helps to prevent hazing of the final product. The temperature during the entire course of the reaction generally ranges from about 160° C. to about 220° C. The polyesterification is considered complete when an acid value of less than 4 mg KOH/gram of polymer is obtained as determined by well known potentiometric titration techniques.

The hydroxyl functional polyesters used in formulating the claimed automotive refinish coating compositions generally have a hydroxyl number ranging from about 100 to about 300, preferably from about 175 to about 275 and more preferably from about 200 to about 260 mg KOH/gram of polymer determined by the above-mentioned potentiometric techniques. The aforesaid hydroxyl functional polyesters generally have a number average molecular weight ranging from about 800 to about 3000, preferably from about 900 to about 1700, the molecular weight determined by gel permeation chromatography (GPC) using polystyrene as a standard.

It should be understood that 2-hydroxyethyl ethylene urea can be used in the preparation of the hydroxyl functional polyester in the same way a monocarboxylic acid would be used for its chain terminating ability. This material can be commercially obtained from Sartomer Company as HEEU.

As would be readily understood by one skilled in the art, a catalyst is typically used to accelerate the polyesterification reaction. Usually butyl stannoic acid or dibutyltin oxide are used. The catalyst is optional, and if used, the amount can vary widely. When used, the amount typically ranges from about 0.1 percent to about 0.25 percent, the percentage based on the total weight of the reactants used in preparing the polyester.

Polyisocyanates are commonly used to cure (crosslink) hydroxyl functional polymers such as the type of polyester polyol described above. In the present invention a particular combination of polyisocyanates is employed to particular advantage. More specifically, at least two different kinds of polyisocyanate are used, one of which is the triisocyanate obtained by converting the amine groups of triaminononane (4-aminomethyl-1,8-diaminooctane) to isocyanate groups by known processes, available from Monsanto Chemical Co., Specialty Resins Division, Springfield, Mass., USA. This product is commonly known as triaminononane triisocyanate ("TTI"), and is characterized by high crosslinking functionality in a relatively low molecular weight (251), and thus low viscosity, material. For the sake of durability to exterior exposure, it is advantageous that TTI is aliphatic.

The other polyisocyanate in addition to TTI which is used in the present invention to cure (crosslink) the hydroxyl functional polymer can be selected from a variety of organic materials including aliphatic, cycloaliphatic as well as aromatic, polyisocyanates, including mixtures thereof. Typically, the polyisocyanate is a diisocyanate. Examples of suitable aliphatic diisocyanates include 1,4-tetramethylene diisocyanate and 1,6-hexamethylene diisocyanate. Examples of suitable aromatic diisocyanates are 4,4'-diphenylmethane diisocyanate, 1,3-phenylene diisocyanate, 1,4-phenylene diisocyanate and toluene diisocyanate. Examples of suitable cycloaliphatic diisocyanates include 1,4-cyclohexyl diisocyanate, isophorone diisocyanate, 4,4'-methylene-bis-(cyclohexyl isocyanate). Triisocyanates such as TMXDI-IMP aliphatic triisocyanate available from Cytec Industries, Inc., can also be used. Isocyanurates and biurets of the diisocyanates described above can also be used. Preferably, the polyisocyanate curing agent of the present invention is an isocyanurate. More preferably the isocyanurate is a blend of isocyanurates, especially a blend of the isocyanurate of isophorone diisocyanate (IPDI) and the isocyanurate of hexamethylene diisocyanate (HDI). The blend generally includes from about 5 percent to about 50 percent IPDI and from about 50 percent to about 95 percent HDI, preferably about 20 percent to about 80 percent IPDI and about 40 percent to about 60 percent HDI. More preferably the blend contains about 25 to about 30 percent IPDI and about 70 to about 75 percent HDI.

The amount of hydroxyl functional polymer and polyisocyanate curing agent in the coating composition of the present invention is such that the ratio of isocyanate equivalents to hydroxyl equivalents ranges from 0.5:1 to 1.8:1. Ratios lower than 0.5 tend to yield coatings that do not exhibit the desired degree of adhesion. With specific embodiments of the present invention, it was found that adhesion was best when the ratio was at least 0.6:1, preferably at least 0.8:1. Ratios above 1.8:1 tend to undesirably increase drying time. For the best drying performance, it was found preferable to use ratios no greater than 1.6:1, most preferably no greater than 1.3:1.

The coating compositions of specific embodiments disclosed here are particularly advantageous in that they provide improvements in the category of liquid coating compositions that have relatively low volatile organic content (VOC). The VOC of the preferred embodiments does not exceed 4.0 pounds per gallon. The coating compositions typically have a resin solids content ranging from about 50 percent to about 90 percent as determined at 110° C. for one hour.

The coating compositions are generally multi-package coating compositions with the hydroxyl functional polymer in one package and the polyisocyanate curing agents in a separate package. Other ingredients of the composition can be included in any package as desired. Alternatively, the coating compositions may be three package compositions, with the hydroxyl functional polyester in one package, the curing agent in a second package and the third package containing an accelerator to assist in speeding up the curing reaction between the hydroxyl and isocyanate groups. Examples of accelerator include materials such as dibutyltin dilaurate and dibutyltin diacetate. Also contained in a third package may be a material to extend pot life, for example, 3-ethyl 2,4-pentanedione, pentanedione or tertiary butyl acetoacetate. The other ingredients may be in any of the packages as desired.

Although the disclosed embodiments are preferably clear coating compositions which can be used as a clear topcoat over a pigmented basecoat, the coating compositions can also be pigmented with a variety of pigments and utilized as a colored basecoat or topcoat, without a clearcoat. Alternatively, the coating compositions can be used as primers if desired. A variety of pigments well known to those skilled in the art can be used including inorganic pigments such as titanium dioxide, silica, iron oxide, talc, mica, carbon black, and zinc oxide. Organic pigments can also be used. In addition, metallic pigments such as aluminum flake and metallic effect pigments such as the pearlescent pigments available from Mearl Corp. can be used.

The claimed coating compositions are typically prepared in a suitable solvent to facilitate formulation and application. Suitable solvents include aliphatic solvents such as VM & P naphtha; aromatic petroleum distillates; cycloaliphatic solvents like cyclohexane; ketones like methylethyl ketone, methyl isobutyl ketone and methyl amyl ketone; alcohols such as ethyl alcohol, propyl alcohol and diacetone alcohol; acetates like butyl acetate and hexyl acetate; and mono and dialkyl ethers of ethylene, propylene and diethylene glycol such as ethylene glycol monethyl ether, ethylene glycol monobutyl ether, ethylene glycol monoethyl ether acetate, diethylene glycol diethyl ether, propylene glycol monomethyl ether, dipropylene glycol ether, and propylene glycol monomethyl ether acetate.

The coating compositions may optionally contain a variety of conventional additives including surfactants, antioxidants, ultraviolet light absorbers, stabilizers, rheology control agents, coalescing agents and the like.

The aforedescribed packages containing the ingredients of the coating composition are typically combined together with mild agitation prior to application. The coating compositions are typically applied by spray application although other well known modes of application can be utilized. As mentioned above, the coating composition is typically applied as a clear topcoat over a pigmented basecoat, including a variety of conventionally known basecoats. The clear topcoat is generally applied at a uniform film thickness ranging from about 2 to about 3 mils. The coating compositions can be cured under ambient conditions or at slightly elevated temperatures by heating to a temperature ranging from about 30° C. to about 60° C.

Embodiments of the present lend themselves to use as automotive refinish coatings in that they can exhibit, in addition to good adhesion and rapid drying, excellent appearance and physical properties including gloss, hardness, and distinctness of image.

EXAMPLES

The following examples compare various formulations of automotive refinish coating compositions in which the hydroxyl functional component was the same and different combinations of isocyanates were employed.

|  | Formula Weight | Solid Resin Weight |
|---|---|---|
| EXAMPLE 1 | | |
| PACKAGE 1 | | |
| Acrylic polyol and polyester[1] | 51.98 | 30.55 |
| PACKAGE 2 | | |
| HDI isocyanurate[2] | 25.00 | 25.00 |
| IPDI isocyanurate[3] | 0 | 0 |
| Triaminononane triisocyanate[4] | 0 | 0 |
| Methyl amyl ketone[5] | 11.19 | |
| PACKAGE 3 | | |
| Reducing solvent blend[6] | 8.89 | |
| Catalyst[7] | 2.94 | 0.05 |
| EXAMPLE 2 | | |
| PACKAGE 1 | | |
| Acrylic polyol and polyester[1] | 70.89 | 41.67 |
| PACKAGE 2 | | |
| HDI isocyanurate[2] | 0 | 0 |
| IPDI isocyanurate[3] | 0 | 0 |
| Triaminononane triisocyanate[4] | 13.89 | 13.89 |
| Methyl amyl ketone[5] | 3.39 | |
| PACKAGE 3 | | |
| Reducing solvent blend[6] | 8.89 | |
| Catalyst[7] | 2.94 | 0.05 |
| EXAMPLE 3 | | |
| PACKAGE 1 | | |
| Acrylic polyol and polyester[1] | 51.98 | 30.56 |
| PACKAGE 2 | | |
| HDI isocyanurate[2] | | |
| IPDI isocyanurate[3] | 15.87 | 11.11 |
| Triaminononane triisocyanate[4] | 13.89 | 13.89 |
| Methyl amyl ketone[5] | 6.42 | |
| PACKAGE 3 | | |
| Reducing solvent blend[6] | 8.89 | |
| Catalyst[7] | 2.94 | 0.05 |
| EXAMPLE 4 | | |
| PACKAGE 1 | | |
| Acrylic polyol and polyester[1] | 70.89 | 41.67 |

|  | Formula Weight | Solid Resin Weight |
|---|---|---|
| PACKAGE 2 | | |
| HDI isocyanurate[2] | 13.89 | 13.89 |
| IPDI isocyanurate[3] | 0 | 0 |
| Triaminononane triisocyanate[4] | 0 | 0 |
| Methyl amyl ketone[5] | 3.39 | |
| PACKAGE 3 | | |
| Reducing solvent blend[6] | 8.89 | |
| Catalyst[7] | 2.94 | 0.05 |
| EXAMPLE 5 | | |
| PACKAGE 1 | | |
| Acrylic polyol and polyester[1] | 51.98 | 30.56 |
| PACKAGE 2 | | |
| HDI isocyanurate[2] | 13.89 | 13.89 |
| IPDI isocyanurate[3] | 15.87 | 11.11 |
| Triaminononane triisocyanate[4] | 0 | 0 |
| Methyl amyl ketone[5] | 6.42 | |
| PACKAGE 3 | | |
| Reducing solvent blend[6] | 8.89 | |
| Catalyst[7] | 2.94 | 0.05 |
| EXAMPLE 6 | | |
| PACKAGE 1 | | |
| Acrylic polyol and polyester[1] | 70.89 | 41.67 |
| PACKAGE 2 | | |
| HDI isocyanurate[2] | 2.78 | 2.78 |
| IPDI isocyanurate[3] | 15.87 | 11.11 |
| Triaminononane triisocyanate[4] | | |
| Methyl amyl ketone[5] | 0 | |
| PACKAGE 3 | | |
| Reducing solvent blend[6] | 7.52 | |
| Catalyst[7] | 2.94 | 0.05 |
| EXAMPLE 7 | | |
| PACKAGE 1 | | |
| Acrylic polyol and polyester[1] | 51.98 | 30.55 |
| PACKAGE 2 | | |
| HDI isocyanurate[2] | 11.11 | 11.11 |
| IPDI isocyanurate[3] | 0 | 0 |
| Triaminononane triisocyanate[4] | 13.89 | 13.89 |
| Methyl amyl ketone[5] | 11.19 | |
| PACKAGE 3 | | |
| Reducing solvent blend[6] | 8.89 | |
| Catalyst[7] | 2.94 | 0.05 |
| EXAMPLE 8 | | |
| PACKAGE 1 | | |
| Acrylic polyol and polyester[1] | 70.89 | 41.67 |
| PACKAGE 2 | | |
| HDI isocyanurate[2] | 0 | 0 |
| IPDI isocyanurate[3] | 15.87 | 11.11 |
| Triaminononane triisocyanate[4] | 2.78 | 2.78 |
| Methyl amyl ketone[5] | 0 | 0 |
| PACKAGE 3 | | |
| Reducing solvent blend[6] | 7.52 | |
| Catalyst[7] | 2.94 | 0.05 |
| EXAMPLE 9 | | |
| PACKAGE 1 | | |
| Acrylic polyol and polyester[1] | 61.43 | 36.11 |
| PACKAGE 2 | | |
| HDI isocyanurate[2] | 8.33 | 8.33 |
| IPDI isocyanurate[3] | 7.94 | 5.56 |
| Triaminononane triisocyanate[4] | 5.56 | 5.56 |
| Methyl amyl ketone[5] | 4.91 | |
| PACKAGE 3 | | |
| Reducing solvent blend[6] | 8.89 | |
| Catalyst[7] | 2.94 | 0.05 |
| EXAMPLE 10 | | |
| PACKAGE 1 | | |
| Acrylic polyol and polyester[1] | 61.43 | 36.11 |
| PACKAGE 2 | | |
| HDI isocyanurate[2] | 13.89 | 13.89 |
| IPDI isocyanurate[3] | 7.94 | 5.56 |
| Triaminononane triisocyanate[4] | 0 | 0 |
| Methyl amyl ketone[5] | 4.91 | |
| PACKAGE 3 | | |
| Reducing solvent blend[6] | 8.89 | |
| Catalyst[7] | 2.94 | 0.05 |
| EXAMPLE 11 | | |
| PACKAGE 1 | | |
| Acrylic polyol and polyester[1] | 58.27 | 34.25 |
| PACKAGE 2 | | |
| HDI isocyanurate[2] | 3.71 | 3.71 |
| IPDI isocyanurate[3] | 5.29 | 3.71 |
| Triaminononane triisocyanate[4] | 13.89 | 13.89 |
| Methyl amyl ketone[5] | 7.01 | |
| PACKAGE 3 | | |
| Reducing solvent blend[6] | 8.89 | |
| Catalyst[7] | 2.94 | 0.05 |
| EXAMPLE 12 | | |
| PACKAGE 1 | | |
| Acrylic polyol and polyester[1] | 64.58 | 37.96 |
| PACKAGE 2 | | |
| HDI isocyanurate[2] | | |
| IPDI isocyanurate[3] | 7.41 | 5.18 |
| Triaminononane triisocyanate[4] | 10.18 | 10.18 |
| Methyl amyl ketone[5] | 6.00 | |
| PACKAGE 3 | | |
| Reducing solvent blend[6] | 8.89 | |
| Catalyst[7] | 2.94 | 0.05 |
| EXAMPLE 13 | | |
| PACKAGE 1 | | |
| Acrylic polyol and polyester[1] | 61.44 | 36.11 |
| PACKAGE 2 | | |
| HDI isocyanurate[2] | 12.50 | 12.50 |
| IPDI isocyanurate[3] | 0 | 0 |
| Triaminononane triisocyanate[4] | 6.94 | 6.94 |
| Methyl amyl ketone[5] | 7.29 | |
| PACKAGE 3 | | |
| Reducing solvent blend[6] | 8.89 | |
| Catalyst[7] | 2.94 | 0.05 |
| EXAMPLE 14 | | |
| PACKAGE 1 | | |
| Acrylic polyol and polyester[1] | 61.44 | 36.11 |
| PACKAGE 2 | | |
| HDI isocyanurate[2] | 4.17 | 4.17 |
| IPDI isocyanurate[3] | 15.87 | 11.11 |

-continued

| | Formula Weight | Solid Resin Weight |
|---|---|---|
| Triaminononane triisocyanate[4] | 4.17 | 4.17 |
| Methyl amyl ketone[5] | 2.53 | |
| PACKAGE 3 | | |
| Reducing solvent blend[6] | 8.89 | |
| Catalyst[7] | 2.94 | 0.05 |

EXAMPLE 15

PACKAGE 1

| | Formula Weight | Solid Resin Weight |
|---|---|---|
| Acrylic polyol and polyester[1] | 51.98 | 30.56 |
| PACKAGE 2 | | |
| HDI isocyanurate[2] | 12.50 | 12.50 |
| IPDI isocyanurate[3] | 7.94 | 5.56 |
| Triaminononane triisocyanate[4] | 6.94 | 6.94 |
| Methyl amyl ketone[5] | 8.81 | |
| PACKAGE 3 | | |
| Reducing solvent blend[6] | 8.89 | |
| Catalyst[7] | 2.94 | 0.05 |

EXAMPLE 16

PACKAGE 1

| | Formula Weight | Solid Resin Weight |
|---|---|---|
| Acrylic polyol and polyester[1] | 70.89 | 41.67 |
| PACKAGE 2 | | |
| HDI isocyanurate[2] | 4.17 | 4.17 |
| IPDI isocyanurate[3] | 7.94 | 5.56 |
| Triaminononane triisocyanate[4] | 4.17 | 4.17 |
| Methyl amyl ketone[5] | 1.01 | |
| PACKAGE 3 | | |
| Reducing solvent blend[6] | 8.89 | |
| Catalyst[7] | 2.94 | 0.05 |

[1]A blend of an acrylic polyol (styrene, hydroxypropyl acrylate, isostearic acid, glycidyl methacrylate, and methyl methacrylate) and a polyester polyol made from 1,4-cyclohexane dicarboxylic acid in accordance with U.S. Pat. No. 5,468,820 (Wilt et al.) available from PPG Industries, Inc., Pittsburgh, Pennsylvania, USA, as "DCU 2035 Clear Coat."
[2]TOLONATE ® HDT-LV from Rhone Poulenc, Inc., Princeton, New Jersey, USA.
[3]LUXATE ® IT1073 in methyl amyl ketone from Olin Chemical Corp., Stamford, Connecticut, USA.
[4]From Monsanto, Specialty Resins Division, Springfield, Massachusetts, USA.
[5]From Eastman Chemical Co., Kingsport, Tennessee, USA.
[6]Blend of aliphatic, aromatic, ketone, and ester solvents commercially available as "DT-870 Thinner" from PPG Industries, Inc., Pittsburgh, Pennsylvania, USA.
[7]2% Dibutyl tin dilaurate in acetylacetone commercially available as "DELTA ® DX-84 Enhancer" from PPG Industries, Inc., Pittsburgh, Pennsylvania, USA.

EVALUATION

The coating compositions of each of the examples was tested for dry time and adhesion. Dry time was the "dust free time," that is, the time at which the surface of the coating was sufficiently free from stickiness such that air-borne particles would not adhere. This was determined by a cotton ball drop test, wherein a standard medicinal cotton ball is dropped from a height of three inches onto a newly applied coating on a horizontally oriented panel. After five seconds, the panel was inverted. If the cotton ball adhered, the test was repeated at intervals of fifteen minutes or less. The first time that the cotton ball dropped from the surface was recorded as the "dry time."

Adhesion was measured by the cross-hatch adhesion test substantially in accordance with the method set forth in ASTM D3359, Method B, whereby a cured coating on a metal panel was scribed with eight parallel cuts through the film 2 millimeters apart, using a Gardner Cross Cut Tester fitted with a PA-2054 RBX blade (both available from Gardco, Pompano Beach, Fla). Eight similar cuts were made at 90 degrees to and crossing the first eleven cuts. Permacel 99 adhesive tape was applied over the area of cuts by pressing down firmly against the coating to eliminate voids and air pockets. Then the tape was sharply pulled off within 90 seconds at an angle substantially parallel to the plane of the coated surface. Adhesion was reported according to the following scale based upon the appearance of the coating in the scribed areas following removal of the tape:

5=The edges of the cuts are completely smooth and none of the lattice squares is detached.

4=Small flakes of coating are detached at intersections. Less than five percent of the area is affected.

3=Small flakes of the coating are detached along edges and at intersections of cuts. The area affected is five to fifteen percent of the lattice.

2=The coating has flaked along the edges and in parts of the square. The area affected in fifteen to thirty-five percent of the lattice.

1=The coating has flaked along the edges of cuts in large ribbons and whole squares have detached. The area affected in thirty-five to sixty-five percent of the lattice.

0=Flaking and detachment worse than rating 1. Over sixty-five percent of the lattice is affected.

The results of the evaluations are set forth in the Table.

TABLE

| Example | HDI | IPDI | TTI | NCO/OH | Dry Time | Adhesion |
|---|---|---|---|---|---|---|
| 1 | 45.0 | 0 | 0 | 1.22 | 45 | 2 |
| 2 | 0 | 0 | 25.0 | 1.13 | 52 | 4 |
| 3 | 0 | 20.0 | 25.0 | 1.97 | 65 | 4 |
| 4 | 25.0 | 0 | 0 | 0.50 | 65 | 3 |
| 5 | 25.0 | 20.0 | 0 | 1.11 | 42 | 0 |
| 6 | 5.0 | 20.0 | 0 | 0.42 | 55 | 3 |
| 7 | 20.0 | 0 | 25.0 | 2.08 | 70 | 4 |
| 8 | 0 | 20.0 | 5.0 | 0.54 | 50 | 3 |
| 9 | 15.0 | 10.0 | 10.0 | 1.05 | 50 | 4 |
| 10 | 25.0 | 10.0 | 0 | 0.75 | 48 | 1 |
| 11 | 6.67 | 6.67 | 25.0 | 1.67 | 55 | 4 |
| 12 | 0 | 9.72 | 19.1 | 1.07 | 47 | 4 |
| 13 | 22.5 | 0 | 12.5 | 1.17 | 50 | 4 |
| 14 | 7.5 | 20.0 | 7.5 | 0.98 | 42 | 4 |
| 15 | 22.5 | 10.0 | 12.5 | 1.60 | 51 | 4 |
| 16 | 7.5 | 10.0 | 7.5 | 0.65 | 40 | 4 |

It is preferred that drying times be less than 50 minutes and that adhesion be rated at least 4. Examples 12 and 14, which are embodiments of the present invention, were outstanding in this regard. Example 16, which otherwise exhibited a very good combination of dry time and adhesion, was not preferred due to shortcomings in the appearance of the cured coating.

Specific embodiments have been set forth with detail herein for the sake of disclosing the best mode of the invention, but it should be understood that other variations and modifications that would be evident to those of skill in the art are encompassed by the invention as defined by the claims.

What is claimed is:

1. A coating composition comprising:
   (a) 55 to 80 weight percent of an active hydrogen group-containing polymer reactive with isocyanate; and
   (b) 20 to 45 weight percent of a polyisocyanate curing agent containing:
      (i) at least 5 weight percent triaminononane triisocyanate, and (ii) at least 5 weight percent of a polyisocyanate different from (i) and characterized by the substantial absence of trivalent nonane groups;

wherein all percentages are based on the sum of the weight of non-volatile resin content of (a) plus (b).

2. The coating composition of claim 1 wherein the polyisocyanate of (ii) is an isocyanurate or blend of isocyanurates.

3. The coating composition of claim 2 wherein the isocyanurate is a blend of the isocyanurate of isophorone diisocyanate and the isocyanurate of hexamethylene diisocyanate.

4. The coating composition of claim 1 wherein the active hydrogen group-containing polymers comprises at least one hydroxyl functional polymer selected from the group consisting of polyols, polyester polyols, and mixtures thereof.

5. The coating composition of claim 1 wherein the volatile organic content does not exceed 4 pounds per gallon.

6. The coating composition of claim 1 wherein the equivalent ratio of isocyanate groups in component (b) to hydroxyl groups in component (a) ranges from 0.5:1 to 1.8:1.

7. The coating composition of claim 1 wherein the equivalent ratio of isocyanate groups in component (b) to hydroxyl groups in component (a) ranges from 0.6:1 to 1.6:1.

8. The coating composition of claim 1 wherein the equivalent ratio of isocyanate groups in component (b) to hydroxyl groups in component (a) ranges from 0.8:1 to 1.3:1.

9. The coating composition of claim 1 wherein at least 50 percent by weight of the total isocyanates in component (b) is triaminononane triisocyanate.

10. The coating composition of claim 1 wherein no more than 90 percent by weight of the total isocyanates in component (b) is triaminononane triisocyanate.

11. The coating composition of claim 1 wherein no more than 80 percent by weight of the total isocyanates in component (b) is triaminononane triisocyanate.

12. The coating composition of claim 1 which is a pigmented coating composition.

13. The coating composition of claim 1 which is a clear coating composition.

* * * * *